US007928896B2

(12) United States Patent
Jin et al.

(10) Patent No.: US 7,928,896 B2
(45) Date of Patent: Apr. 19, 2011

(54) APPLICATION OF TIME REVERSAL TO SYNTHETIC APERTURE IMAGING

(75) Inventors: Yuanwei Jin, Salisbury, MD (US); José M. F. Moura, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 30 days.

(21) Appl. No.: 12/217,839

(22) Filed: Jul. 9, 2008

(65) Prior Publication Data

US 2009/0033549 A1 Feb. 5, 2009

Related U.S. Application Data

(60) Provisional application No. 60/958,756, filed on Jul. 9, 2007.

(51) Int. Cl.
*G01S 13/00* (2006.01)
(52) U.S. Cl. ............... 342/85; 342/73; 342/118
(58) Field of Classification Search ............ 342/85, 342/73, 118
See application file for complete search history.

(56) References Cited

U.S. PATENT DOCUMENTS

| 4,633,253 | A | 12/1986 | Stove et al. | |
|---|---|---|---|---|
| 5,428,999 | A | 7/1995 | Fink | |
| 5,431,053 | A | 7/1995 | Fink | |
| 5,734,346 | A * | 3/1998 | Richardson et al. | 342/124 |
| 7,535,409 | B1 * | 5/2009 | Choe et al. | 342/159 |
| 2003/0005770 | A1 | 1/2003 | Berryman | |
| 2005/0094539 | A1 | 5/2005 | Minemura et al. | |
| 2005/0146433 | A1 | 7/2005 | Waltermann | |
| 2005/0237236 | A1 * | 10/2005 | Budic | 342/159 |
| 2005/0273008 | A1 | 12/2005 | Montaldo et al. | |
| 2007/0038060 | A1 | 2/2007 | Cerwin et al. | |

OTHER PUBLICATIONS

Soumekh; Synthetic Aperture Radar Signal Processing; New York, NY: John Wiley & Sons, Inc.; 1999.
Carrara, et al.; Spotlight Synthetic Aperture Radar: Signal Processing Algorithms; Boston, MA: Artech House; 1995.
Deraaf; SAR Imaging Via Modern 2-D Spectral Estimation Methods; IEEE Transactions on Image Processing; vol. 7, No. 5; pp. 729-761; May 1998.
Jin and Moura; TR-SAR: Time Reversal Target Focusing in Spotlight SAR; ICASSP '07; IEEE International Conference on Signal Processing; vol. 2; pp. 957-960; Apr. 2007.
Jin, et al.; Time Reversal Synthetic Aperture Radar Imaging in Multipath; Proc. of the 41st Asilomar Conf. on Signals, Systems and Computers; IEEE; pp. 1812-1816; Nov. 2007.
Nguyen, et al.; Superresolution HRR ATR with High Definition Vector Imaging; IEEE Transactions on Aerospace and Electronics Systems; vol. 37, No. 4; pp. 1267-1286; Oct. 2001.
Benitz; High Definition Vector Imaging; Lincoln Laboratory Journal; vol. 10, No. 2; pp. 147-170; 1997.

(Continued)

*Primary Examiner* — Thomas H Tarcza
*Assistant Examiner* — Timothy A Brainard
(74) *Attorney, Agent, or Firm* — Jones Day

(57) ABSTRACT

A method and apparatus for target focusing and ghost image removal in synthetic aperture radar (SAR) is disclosed. Conventional SAR is not designed for imaging targets in a rich scattering environment. In this case, ghost images due to secondary reflections appear in the SAR images. We demonstrate, how, from a rough estimate of the target location obtained from a conventional SAR image and using time reversal, time reversal techniques can be applied to SAR to focus on the target with improved resolution, and reduce or remove ghost images.

12 Claims, 5 Drawing Sheets

OTHER PUBLICATIONS

Jakowatz, et al.; Spotlight-Mode Synthetic Aperture Radar: A Signal Processing Approach; Boston, MA: Kluwer Academic Publishers; 1996.

Jin, et al.; Time Reversal Beamforming for Microwave Breast Cancer Detection; IEEE, ICIP; Appendix A to U.S. Appl. No. 60/958,756; pp. 13-16; 2007.

Moura and Jin; Time Reversal Imaging by Adaptive Interface Canceling; IEEE Transactions on Signal Processing; Appendix B to U.S. Appl. No. 60/958,756; Jun. 2007.

Fink; Time Reversed Acoustics; Physics Today; vol. 50, No. 3; pp. 34-40; 1997.

Moura, et al.; Single Antenna Time Reversal Adaptive Interference Cancelation; ICASSP '05; IEEE Int'l Conf. on Signal Processing; vol. 4; pp. 1121-1124; Mar. 2005.

Moura and Jin; Detection by Time Reversal: Single Antenna; IEEE Transactions on Signal Processing; vol. 55, No. 1; pp. 187-201; Jan. 2007.

* cited by examiner

APPLICATION OF TIME REVERSAL TO SYNTHETIC APERTURE IMAGING

CROSS REFERENCE TO RELATED APPLICATIONS

The present application claims priority from copending U.S. application Ser. No. 60/958,756 entitled Time Reversal for Synthetic Aperture Imaging and Medical Imaging filed Jul. 9, 2007, which is hereby incorporated by reference for all purposes.

GOVERNMENT RIGHTS

This disclosure was supported by DARPA Grant No. W911NF-04-1-0031. The government may have rights in this invention.

BACKGROUND

The present disclosure relates generally to imaging systems and more particularly to imaging systems using synthetic aperture or tomographic imaging techniques.

Synthetic aperture radar (SAR) images a target region reflectivity function in the multi-dimensional spatial domain of range and cross range [I]. SAR synthesizes a large aperture radar. The cross range resolution of the SAR is $R\lambda/D$, where D is the synthetic aperture, R is the target range, and $\lambda$ is the wavelength of the measured waveform.

When imaging a target, the conventional SAR theory does not include the effects of multiple scattering from the surrounding objects in a high clutter area. In addition to the true target image, multiple-bounce echoes caused by surrounding scatterers produce spurious and random patterns in the formed SAR image. We refer to these as ghost images. A common practice to distinguish the true target from its ghost images is leading edge detection, i.e., if the ghost image is caused by trailing echoes, we may identify the peak that has the shortest range as the target. However, unless we know a priori where the scatterers are, or what their physical characteristics are, it is difficult to distinguish the true target from the ghost images.

Thus, a need exists for a SAR imaging system having improved performance

SUMMARY

In this disclosure, we use a multi-look averaging technique to remove ghosts and to provide an estimate of the target location. The estimated target location is used to estimate a target phase angle or delay time. We can then use that information to focus time reversed signals on the target to form a clean target map with high resolution in a high clutter scene.

The time reversal step focuses on the dominant patterns and provides higher resolution. Focusing on a chosen pattern with high resolution resembles a camera to zooming in on a particular spot to see the details of its structure. The details may be the size or the shape of the target. If the focused spot has a target, we can recognize its shape or its size. However, if the focused spot is a ghost pattern, the details are blurred and random, and do not resemble any particular object. Thus, we are able to distinguish the target from its ghost patterns. To further improve the accuracy of the initial estimate of the location of a fixed target from the conventional SAR images, we can average a number of SAR images taken from different look angles. Due to the randomness of the appearance of the ghost patterns in SAR images, the averaging enhances the intensity of the target spot while reducing the intensity of the ghost patterns.

Time reversal is well known for its temporal and spatial focusing in highly cluttered environments [2, 3, 4]. Experiments have demonstrated that time reversal produces a higher resolution that exceeds the Rayleigh limit. We develop here methodologies and algorithms that form cleaner and higher resolution images by time reversal than conventional SAR. Those advantages and benefits, and others, will be apparent from the detailed description below.

BRIEF DESCRIPTION OF THE FIGURES

The present disclosure is described, for purposes of illustration and not limitation, in connection with the following figures, wherein.

DETAILED DESCRIPTION

Synthetic aperture radar (SAR) is used for ground mapping as well as target identification. The general principle behind SAR is to coherently combine the amplitude and phase information of radar returns from a sequence of transmitted pulses from a relatively small antenna. When imaging a target, the conventional SAR theory does not include the effects of multiple scattering from the surrounding objects in a high clutter area. In addition to the true target image, multiple-bounce echoes caused by surrounding scatterers produce spurious and random patterns in the formed SAR image. We refer to these as ghost images. Thus, the target image is obscured by the ghost images. A common practice to distinguish the true target from its ghost images is leading edge detection, i.e., if the ghost image is caused by trailing echoes, we may identify the peak that has the shortest range as the target. However, unless we know a priori where the scatterers are, or what their physical characteristics are, it is difficult to distinguish the true target from the ghost images.

Figure 1A:
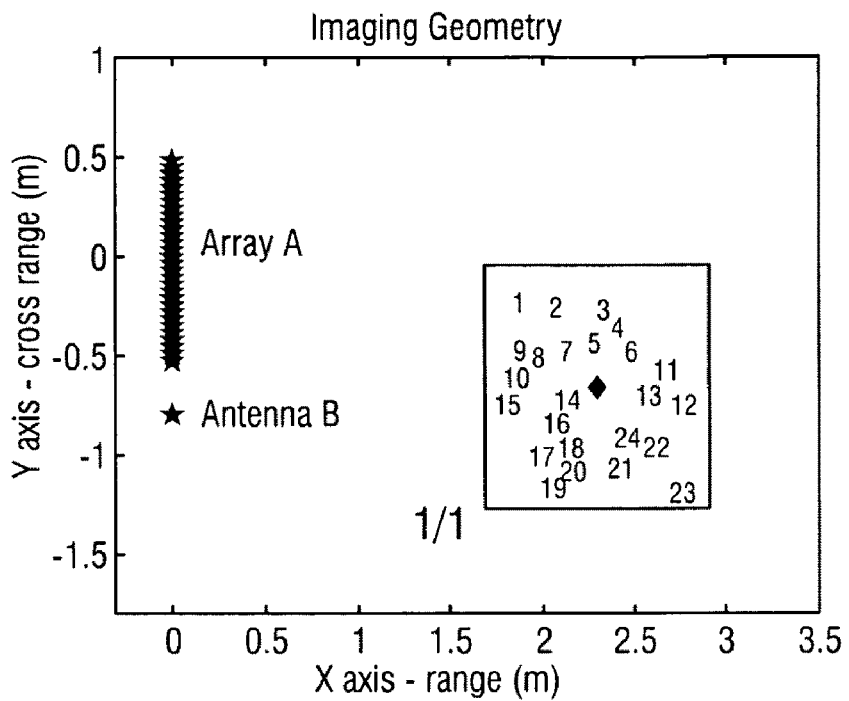
FIG. 1 illustrates the geometry of a bi-static spotlight SAR in squint mode.
Figure 1B:
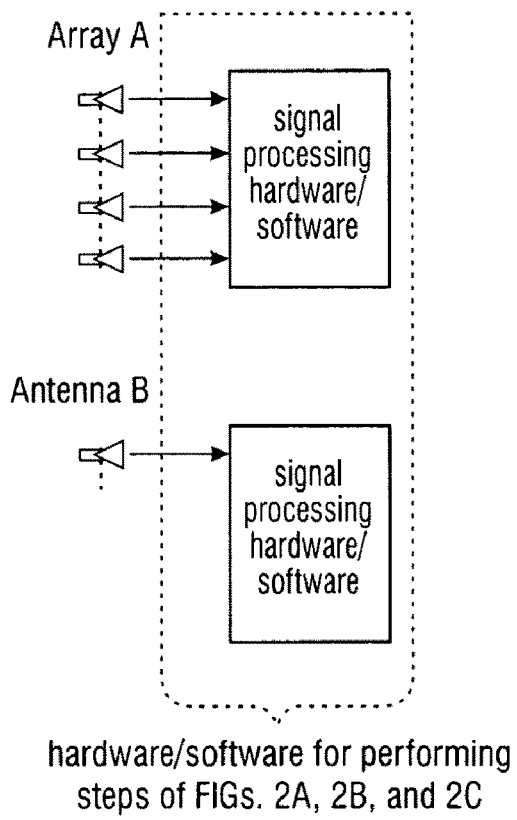

This disclosure, combining time reversal with synthetic aperture radar (TR-SAR), can reduce or remove ghost patterns and form a clean target map in a high clutter scene. Furthermore, once we identify a target spot, we can examine the shape or the size of the target with improved resolution. A detailed description of our apparatus and method is given below We illustrate our method with a bi-static SAR system as shown in FIG. 1, although the method of the present invention can be used with mono-static systems as well. Bistatic radar employs two antenna sites as illustrated in FIG. 1. The target is illuminated by the transmitter at one site, while the target echoes (returns) are detected and processed by the receiver at the second site. FIG. 1 depicts the geometry of the bi-static spotlight SAR. A moving transmit antenna, denoted by the letter A synthesizes an aperture u∈[−L, L] with total size 2 L. The center of the aperture is chosen to be the origin in the Cartesian coordinate system. The y-axis is along the aperture direction u. A fixed antenna, denoted by the letter B, is at location $(X_B, Y_B)$. The target area is $[X_c-X_o, X_c+X_o]\times[Y_c-Y_o, Y_c+Y_o]$ and is centered at $(X_c, Y_c)$ (denoted by the diamond) with its boundary indicated by the large square. The numbers indicate the scatterer locations. The $n^{th}$ scatterer (or target) coordinates are $(Xc+x_n, Y_c+y_n)$.

Our disclosed system and method will now be described in conjunction with FIG. 2.

Figure 2A:
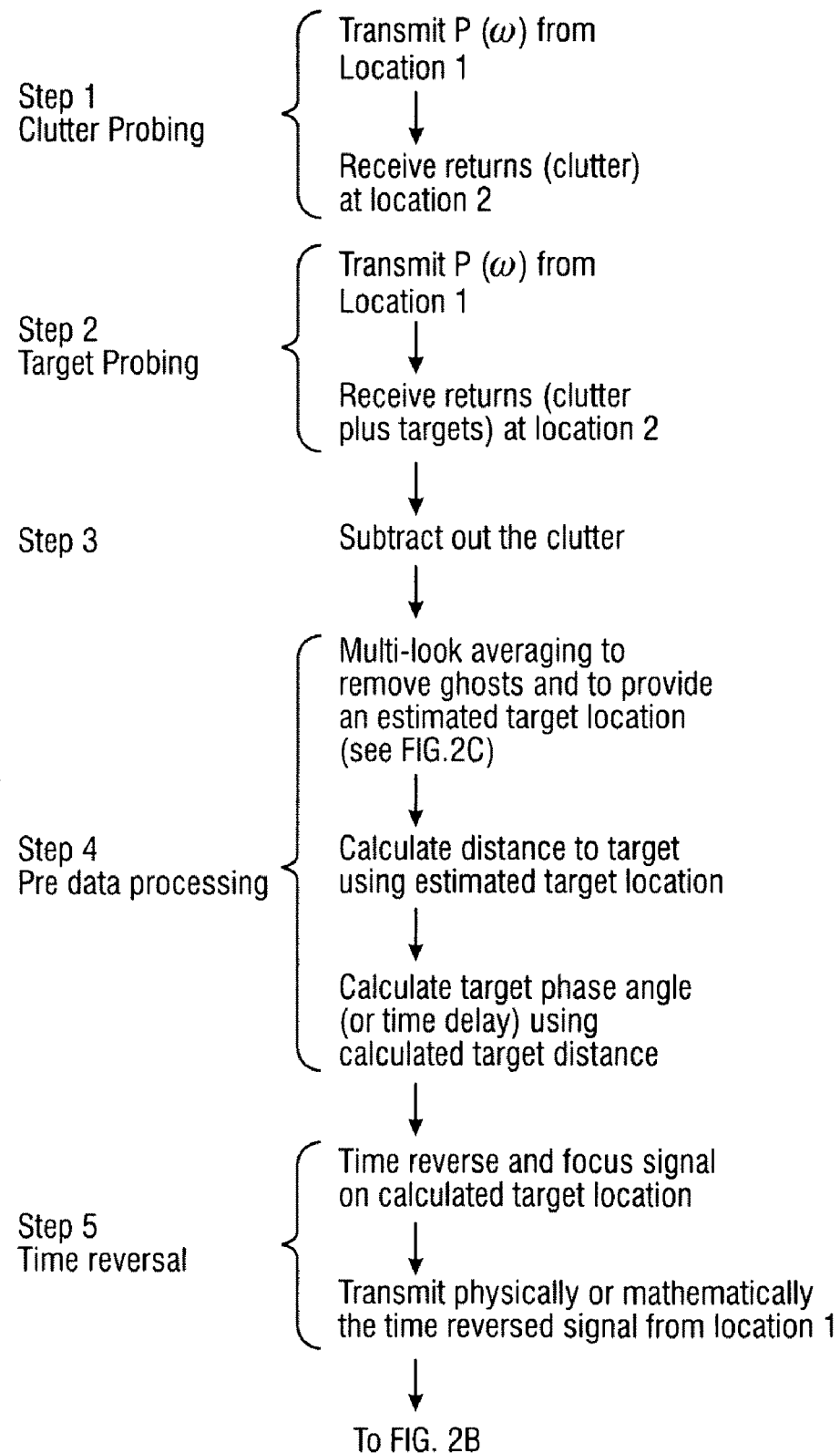
FIGS. 2A and 2B are a flow diagram of the disclosed imaging process.
Figure 2B:
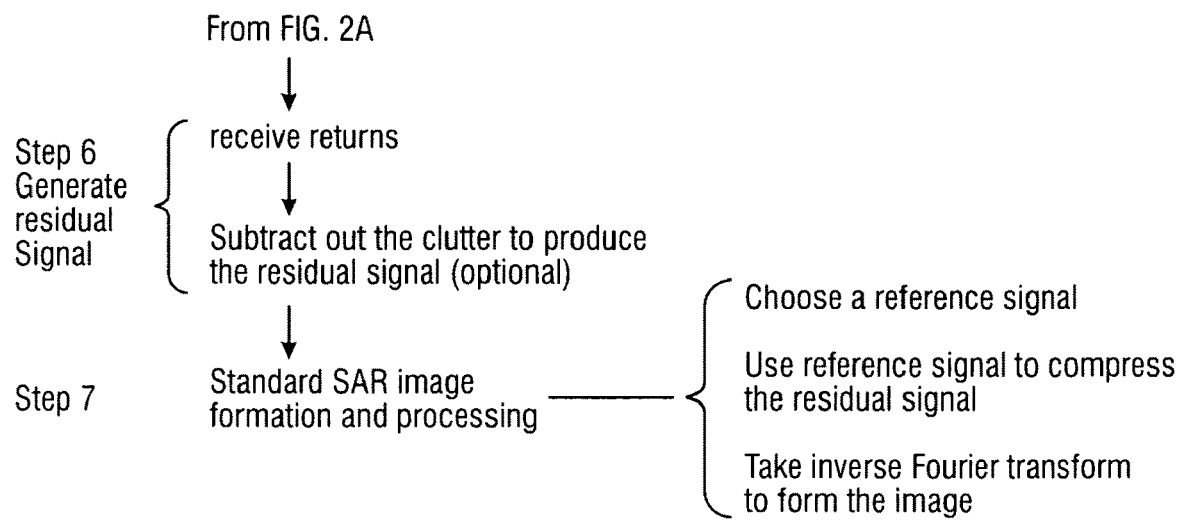
Figure 2C:
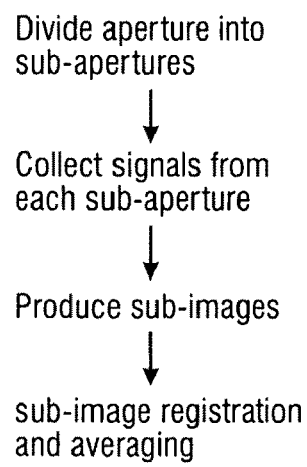
FIG. 2C is a flow diagram of a multi-look averaging process.

In FIG. 2, step 1 is indicated as clutter probing. In this step, probing signal $P(\omega)$ is physically transmitted from antenna A. Antenna A moves along the y-axis with coordinates (0, u), where u∈[−L, L]. Antenna A at aperture (0, u) transmits signal $P(\omega)$ with bandwidth Ω. The signal (return) received at antenna B is $P(\omega) H_c(\omega, u)$ where $H_c(\omega, u)$ is the clutter response. For a stationary area, it is possible to estimate the clutter response by collecting a large number of samples at frequency ω and aperture u.

The next step, step 2, is target probing. The target in this step is now present but is masked by the clutter. In this step the same signal $P(\omega)$ is physically transmitted from antenna A. Antenna A moves along the same aperture path as before and transmits the same signal $P(\omega)$ as before. However, the signal (return) received at antenna B is $P(\omega)H_{c+t}(\omega,u)$ where $H_{c+t}(\omega,u)$ is the clutter plus target response. Steps 1 and 2 together may be thought of as generating target data or, more particularly, generating clutter data and generating combined clutter and target data, respectively. For a stationary scene, it is possible to remove the clutter by subtracting strong returns from clutter, yielding the target response at frequency ω and aperture u $H(\omega,u)=H_{c+t}(\omega,u)-H_c(\omega,u)$.

The target channel response can be decomposed as $$G(\omega,u)=\tau_n H(\omega,u)e^{-jkR_n(u)}, \quad (1)$$

where $R_n(u)$ is the distance between the transmitter (at a fixed location in our imaging geometry $(X_B, Y_B)$), the target at $(X_c+x_n, Y_c+y_n)$, and the receiver at the aperture (0, u)

$$R_n(u) = \sqrt{(X_c + x_n)^2 + (Y_c + y_n - u)^2} + \sqrt{(X_c + x_n - X_B)^2 + (Y_c + y_n - Y_B)^2}.$$

The symbol $\tau_n$ is the n-th target reflectivity, i.e., the target radar cross section (RCS); $k=\omega/c$ is the wave number; the relative multi-path channel is $$H(w, u) = 1 + \sum_{l=1}^{L-1} \alpha_l e^{-jk\Delta R_{n,l}}. \quad (2)$$

Symbols $\alpha_l$ and $\Delta R_{n,l}$ denote the amplitude and differential distance, respectively, of the l-th multi-path reflected from the n-th target. The l-th term $$\alpha_l e^{-jk\Delta R_{n,l}} \quad (3)$$

appears as a ghost pattern in the SAR image and characterizes the relative strength and location of the ghost pattern. If not properly removed, these ghost patterns will degrade the image solution and obscure the true target image. A goal of our method is to remove the ghost patterns in conventional SAR images and form a clean target map with improved target detectability and resolution in a multi-path rich scattering environment. Next, we derive signal models for the convention SAR and TR-SAR.

In Step 3, the clutter component is subtracted out and the received target signal can be represented as follows.

$$S(\omega,u)=P(\omega)\tau_n H(\omega,u)e^{-jkR_n(u)}, \quad (4)$$

where $P(\omega)$ is the probing signal and the additive noise is not considered for the moment. Direct SAR processing of the data given in equation (4) yields a conventional SAR image. This image contains ghost patterns. Note that the ghost patterns are look angle dependent in a rich multi-path scattering environment [5]. In step 4 we use multi-look averaging to remove ghost images [5], [8]. The multi-look averaging can be described as follows.

Figure 4:
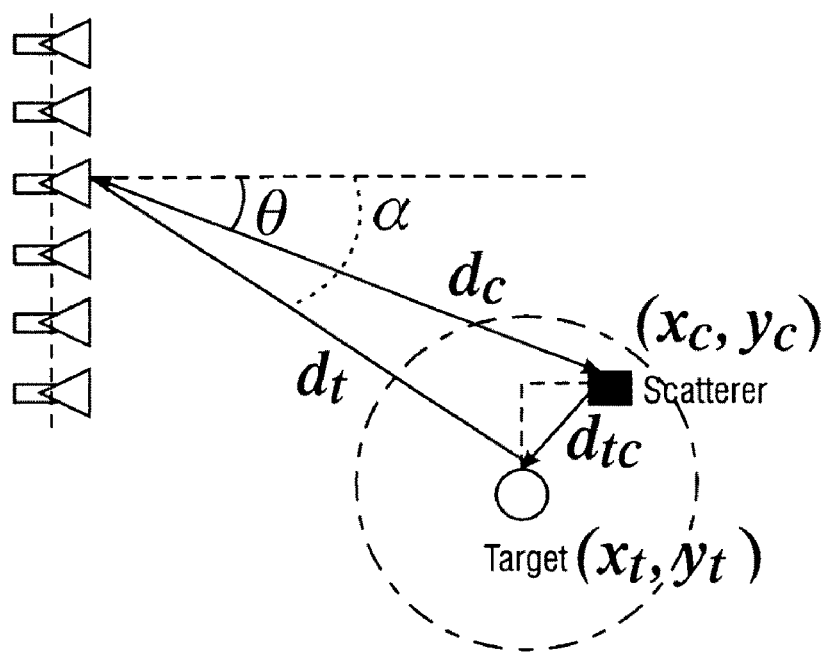
FIG. 4 illustrates the effect of multi-path due to random placement of a scatterer near a target.

FIG. 4 shows the effect of multi-path due to random placement of a scatterer near a target. The single reflection returned signal travels a total distance of $d_c+d_{tc}+d_t$. This returned signal induces ghost artifacts. To characterize the location of the ghost artifacts that appear on a SAR image, we calculate the ghost range $x_g$ and the cross range $y_g$. We define the target coordinates as follows:

$$x_t=d_t \cos\alpha, y_t=d_t \sin\alpha$$

where α is the aspect angel of the target with respect to the synthetic aperture. Hence, the scatterer coordinates are $$x_c=d_c \cos\theta, y_c=d_c \sin\theta$$

where θ is the aspect angle of the scatterer with respect to the antenna. By Taylor series expansion, we have:

$$\begin{cases} \cos(\alpha + \Delta\theta) = \cos\alpha - \sin\alpha\Delta\theta + O(\Delta^2\theta) \\ \sin(\alpha + \Delta\theta) = \sin\alpha + \cos\alpha\Delta\theta + O(\Delta^2\theta) \end{cases}$$

Let $d_g=(d_t+d_c+d_{tc})/2$ and define $$x_g = d_g\cos\alpha, \quad y_g = d_g\sin\alpha$$

we have $$\begin{cases} x_g = \dfrac{x_t + x_c}{2} + \dfrac{y_c}{2}\Delta\theta + \dfrac{d_{tc}}{2}\cos\alpha \\ y_g = \dfrac{y_t + y_c}{2} - \dfrac{x_c}{2}\Delta\theta + \dfrac{d_{tc}}{2}\sin\alpha \end{cases}$$

In a SAR scenario, the cross range $y_c \ll x_c$ and a is a small angle, i.e., cos α~1, sin α~α. Therefore, we have the following approximation:

$$\begin{cases} x_g \approx \dfrac{x_t + x_c}{2} + \dfrac{d_{tc}}{2} \\ y_g \approx \dfrac{y_t + y_c}{2} - \underbrace{\dfrac{x_c}{2}\Delta\theta}_{\text{scattering spread}} + \underbrace{\dfrac{d_{tc}}{2}\alpha}_{\text{scattering density}} \end{cases}$$

The previous approximation, shows that the ghost artifacts in cross range $y_g$ depend on the scattering spread ($\Delta\theta$) and the scattering density (α and $d_{tc}$). The analysis demonstrates that the appearance of the ghost pattern artifacts is look angle α dependent. Because the true target location is fixed, averaging multi-look images, either coherently or non-coherently, will reduce or remove the ghost patterns and enhance the intensity of the target. Hence, from the averaged multi-look images, we obtain a rough estimate of the target location with a coarse resolution. Later, the estimated target location can be used for reconstructing the TR-SAR images in the full aperture domain to retain full resolution.

For example, we collect signals (4) at M locations of the aperture $\{u|u_1, \ldots, u_M\}$. We divide the full aperture into two sub-apertures, $U_1=\{u|u_1, \ldots, u_{M/2}\}$ and $U_2=\{u|u_1, \ldots, u_M\}$. Feeding these two sub-aperture data into a standard SAR processing train yields two sub-images $I_1$ and $I_2$. Averaging these two sub-images after proper image registration, coherently or incoherently, leads to a third image from which we obtain the estimated target location $(\hat{x}_n, \hat{y}_n)$. Then, in the second part of step 4, using the estimated target location $(\hat{x}_n, \hat{y}_n)$ we calculate the target distance $\hat{R}_n(u)$ as follows (from which the time delay can be calculated):

$$\hat{R}_n(u) = \sqrt{(X_c + \hat{x}_n)^2 + (Y_c + \hat{y}_n - u)^2} + \sqrt{(X_c + \hat{x}_n - X_B)^2 + (Y_c + \hat{y}_n - Y_B)^2}.$$

Additional information about multi-look averaging as applied to SAR may be found in Y. Jin, J. M. F. Moura, Y. Jiang, J. Zhu, and D. Stancil, "Time reversal target focusing in spotlight SAR", 15th Adaptive Sensor Array Processing Workshop, MIT Lincoln Lab, Lexington, Mass., Jun. 5-6, 2007, the entirety of which is hereby incorporated by reference for all purposes.

Step 5 in FIG. 2 is the time reversal step. The time-reversed, energy normalized probing signal to be transmitted is:

$$P_u(\omega, u) = k_u [S(\omega, u) e^{jk\hat{R}_n(u)}]^* \quad (5)$$

where the normalized factor is:

$$k_u = \sqrt{\frac{\int_w |P(w_q)|^2 dw}{\int_w |S(w, u)|^2 dw}}. \quad (6)$$

If we let $$\bar{k}_u = k_u \sqrt{\frac{\int_w |P(w_q)|^2 dw}{\int_w |P(w)H(w, u)|^2 dw}}. \quad (7)$$

we can rewrite equation (5) as $$P_u(\omega, u) = \bar{k}_u P^*(\omega) H^*(\omega, u) e^{j\Phi_{n,\omega,u}}, \quad (8)$$

where $$\Phi_{n,\omega,u} = k(R_n(u) - \hat{R}_n(u))$$

is the phase offset. Here, we assume the phase offset is zero, i.e., $$\Phi_{n,\omega,u} = 0$$

and the propagation channel is reciprocal.

In FIG. 2, at step 6, the signal received in response to the time reversed transmission is given by:

$$S_{tr}(w, u) = P_{tr}(w, u) \tau_n H(w, u) e^{-jkR_n(u)} \quad (9)$$

$$= \bar{k}_u P^*(w) \tau_n |H(w, u)|^2 e^{-jkR_n(u)} \quad (10)$$

Feeding the conventional SAR target data from equation (4) and TR-SAR target data from equation (10) to a standard SAR processing train (See FIG. 2, step 7), we obtain two SAR full aperture images. We have shown the resolution improvement by TR-SAR in [4], [5]. Next, we show that, from a detection theory standpoint, TR-SAR yields higher detection probability than the conventional SAR.

Detection by TR-SAR

In this section, we examine the performance of the time reversal when used in conjunction with synthetic aperture radar (SAR) for detecting a target concealed in clutter. We have proposed time reversal SAR (TR-SAR) in [4], [5]. To simplify the analysis, we interpret SAR imaging as beamforming, i.e., the SAR data-collection and image formation process is a simple beamformer with sidelobe control [6], [7]. We examine the detection performance by TR-SAR and convention SAR. To be consistent with our experimental setup, we use discrete representation of the SAR signals, i.e., we use $\omega_q$, $q=0, \ldots, Q-1$, frequency samples, and $u_m$, $m=1, \ldots, M$ aperture samples. Hence, the received SAR data (for conventional change detection) in equation (4) can be written as:

$$P_{CD}(\omega_q, u_m) = \tau_n P(\omega_q) H(\omega_q, u_m) e^{-jk_q R_n(u_m)} + W(\omega_q, u_m), \quad (11)$$

where $u_m$ is the m-th aperture, $k_q = \omega_q/c$. $W(\omega_q, u_m) \sim CN(0, \sigma_\omega^2)$ is the additive noise.

To form a SAR image, we first stack $P_{CD}(\omega_q, u_m)$ as a vector:

$$p_{CD} = \text{vec}\{P_{CD}(\omega_q, v_m)\}, q=0, \ldots, Q-1, m=1, \ldots, M. \quad (12)$$

The weighting coefficients for each pixel x in the image are given by $V_{q,m}(x)$ (for example, a windowed fast Fourier transform, or FFT, [7]) and written as a vector $v(x) = \text{vec}\{V_{q,m}(x)\}$. Hence, the target radar cross section (RCS) can be obtained by:

$$|\hat{\tau}_{CD}|^2 = |\langle p_{CD}, v(x) \rangle|^2 \quad (13)$$

$$= \left| \sum_{q=0}^{Q-1} \tau_n \sum_{m=1}^{M} H(w_q, u_m) e^{-jk_q R_n(u_m)} V_{q,m}(x) + \sum_{q=0}^{Q-1} \sum_{m=1}^{M} W(w_q, u_m) V_{q,m}(x) \right|^2$$

$$= \left| \sum_{q=0}^{Q-1} \tau_n \sum_{m=1}^{M} e^{-jk_q R_n(u_m)} V_{q,m}(x) + \sum_{q=0}^{Q-1} \tau_n \sum_{m=1}^{M} H(w_q, u_m) e^{-jk_q R_n(u_m)} V_{q,m}(x) + \sum_{q=0}^{Q-1} \sum_{m=1}^{M} W(w_q, u_m) V_{q,m}(x) \right|^2.$$

In equation (13), the first term is the target phase history data; the second term is induced by a multi-path that produces ghost images [4], [5]; the last term is the additive noise. Similarly, using time reversal, the received SAR data is $$P_{tr}(\omega_q, u_m) = \tau_n P^*(\omega_q) |H(\omega_q, u_m)|^2 e^{-jk_q R_n(u_m)} + W(\omega_q, u_m). \quad (14)$$

The vectorized SAR data is:

$$p_{tr} = \text{vec}\{P_{tr}(\omega_q, u_m)\}, q=0, \ldots, Q-1, m=1, \ldots M. \quad (15)$$

The estimated target RCS by time reversal is:

$$|\hat{\tau}_{tr}|^2 = |\langle p_{TR}, v(x)\rangle|^2 \quad (16)$$

$$= \left| \sum_{q=0}^{Q-1} \tau_n \bar{k}_u \sum_{m=1}^{M} |H(w_q, u_m)|^2 e^{-jk_q R_n(u_m)} V_{q,m}(x) + \sum_{q=0}^{Q-1} \sum_{m=1}^{M} W(w_q, u_m) V_{q,m}(x) \right|^2.$$

Figure 5:
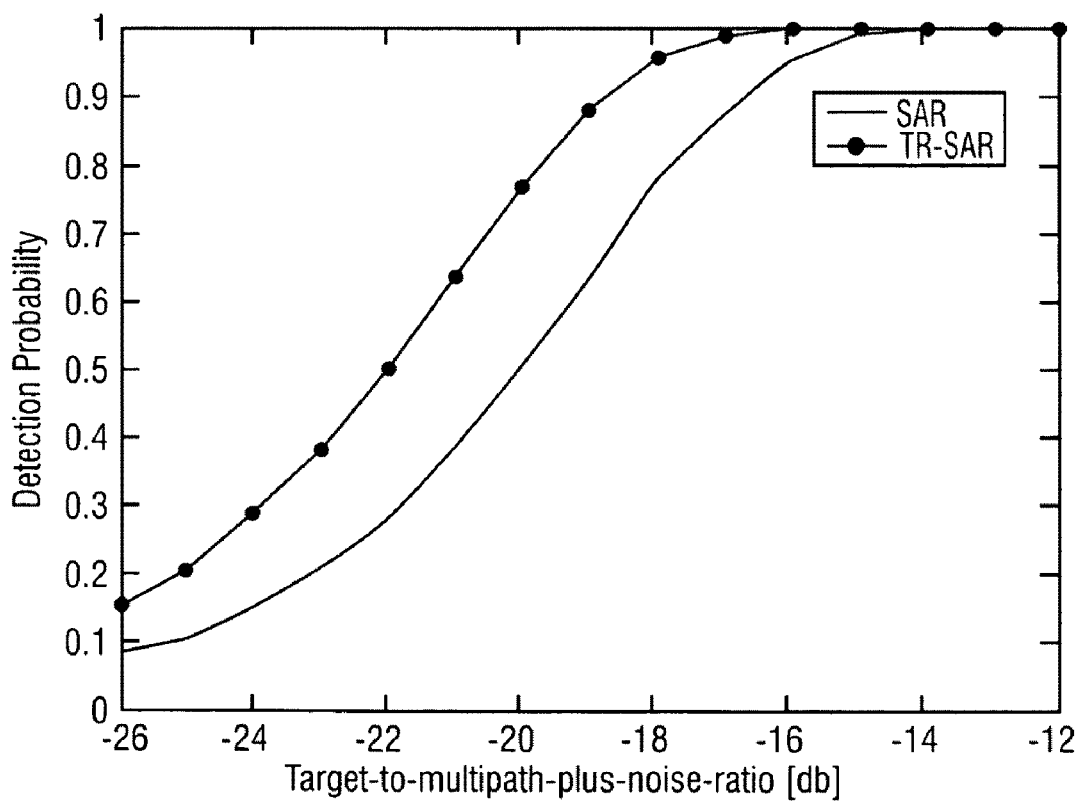
FIG. 5 is a comparison of the disclosed time reversed method vs. conventional detection in SAR.

Compared with equation (13), the ghost images are removed in (16). See FIG. 5 which illustrates time reversal vs. conventional detection in SAR. In the figure, $P_{fa}$=0.01. The imaging geometry is shown in FIG. 1A. The antenna collects SAR data at 10 positions. As a result, the time reversal SAR images produce a clean map of the target with improved resolution and detectability.

We now compare the performance of TR-SAR with conventional SAR using a different metric. The imaging geometry is shown in FIG. 1. The experimental setup is described below. In FIG. 3 we compare the receiver operating characteristics based on (13) and (16). We choose the weighting coefficients to satisfy:

$$V_{q,m}(x) = e^{-jk_q R_n(u_m)}$$

That is, the beamformer matches with the target response. We define the target-to-multi-path noise ration (TMNR) as:

$$TMNR = \frac{\tau_n^2 Q^2 M^2}{\tau_n^2 \sum_{m=1}^{M} \sum_{q=0}^{Q-1} |H(w_q, u_m)|^2 + QM\sigma_w^2}. \quad (17)$$

To test our analysis, we performed electromagnetic measurements in a laboratory environment. The geometry is shown in FIG. 1. The target is a single copper pipe with 1.5 cm in diameter and 2.5 m in length. The scatterers are dielectric pipes 3 cm in diameter and 2.5 m in length. Besides the dielectric pipes, we add a few copper pipes as scattering objects. Two dielectric pipes are wrapped with aluminum foils to increase the reflectivity. All the pipes stand vertically. We use two horn antennas operating in the frequency range 4-6 GHz (wavelength of the center frequency $\lambda c$=6 cm), one for transmitting and one for receiving. Antenna A moves along a slider to synthesize a synthetic aperture of about one meter long. We take 30 positions with an increment of 3.5 cm. Antenna B is at a fixed location. Both antennas are elevated to about 1.2 meters above ground. Thus, we measure the cylindrical wave propagating between the antennas and the scattering objects. During the measuring process, the two horn antennas point to the target area centered at $(X_c, Y_c)$=(2.3, −0.65) meter of size 1.2 meter by 1.2 meter. This is the spotlight mode in a bi-static configuration. We extract the SAR signature of the targeted area by range and cross range gating. We use the range stacking algorithm described in [1] to implement SAR.

Figure 3A:
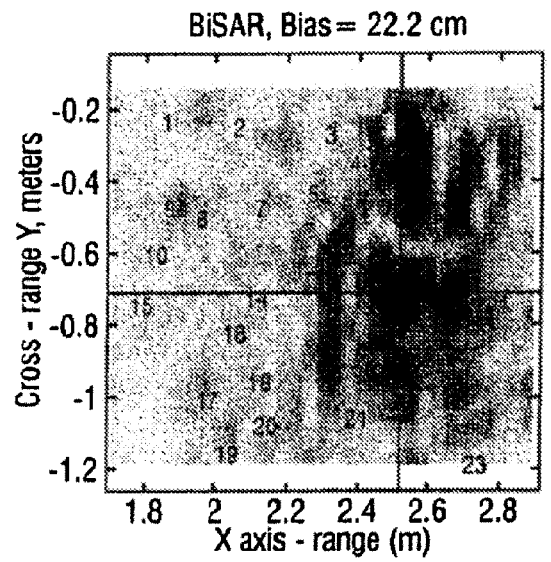
FIG. 3A illustrates a conventional SAR image with ghost patterns.
Figure 3B:
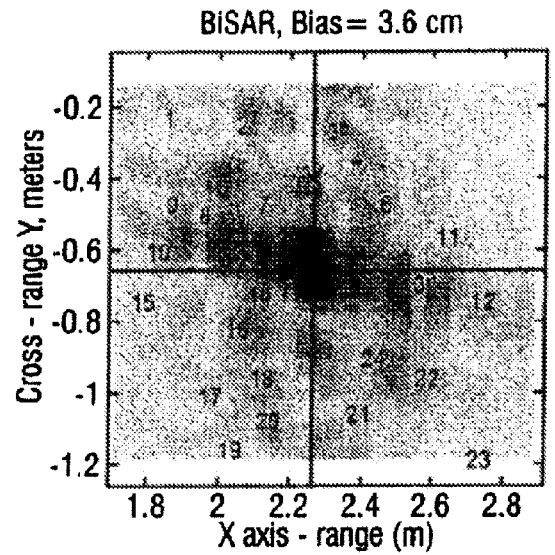
FIG. 3B illustrates a TR-SAR image, FIG. 3C. illustrates conventional SAR with a peak picking technique.
Figure 3C:
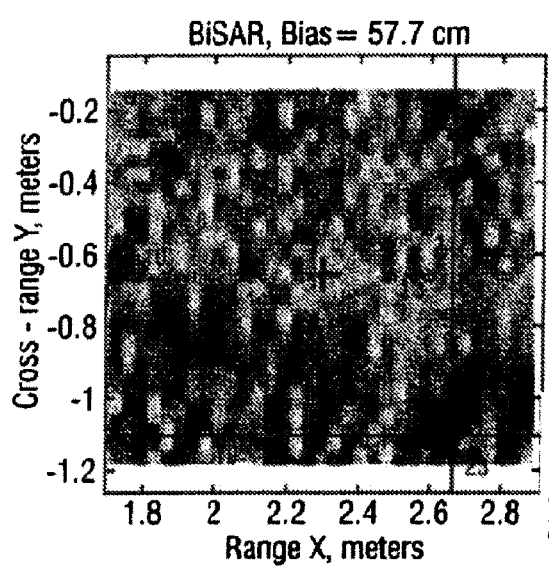
FIGS. 3D and 3E illustrate range and cross range plots for the images of FIG. 3A and FIG. 3B, respectively. In the figures, the shorter and thicker cross indicates the exact target location while the larger cross represents the peak of the image.

FIG. 3A. depicts the conventional SAR image and FIG. 3B the TR-SAR image. In all the images, the shorter and thicker cross indicates the exact target location, while the larger cross represents the peak of the image. Numbers indicate the locations of the scatterers. The conventional SAR image, FIG. 3A, shows numerous ghost patterns and the peak of the image is far away from the target location. The bias is about 22.2 cm (about 3.7 $\lambda c$). By choosing the closest pattern in range, we obtain the target estimate of (2.3, −0.6) meters. The TR-SAR is shown in FIG. 3B. The ghost patterns are clearly removed in the TR-SAR image. The bias is reduced to 3.6 cm (or 0.6 $\lambda c$). If we carry out the peak picking technique in conventional SAR processing, we obtain an image shown in the FIG. 3C. The image quality is very poor.

Figure 3D:
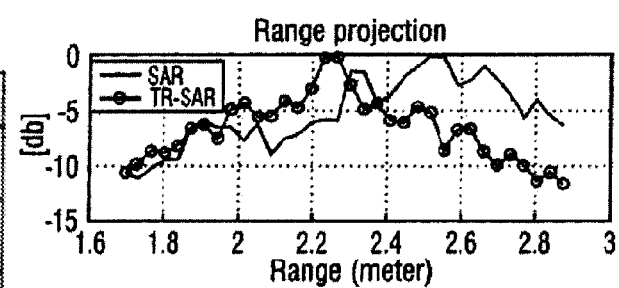
Figure 3E:
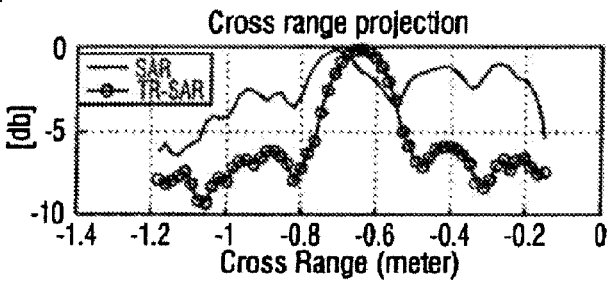

To examine the resolution, we project the SAR image (FIG. 3A) and TR-SAR image (FIG. 3B) onto range and cross range, as shown in FIGS. 3D and 3E, respectively. The cross range resolution (−3 dB) for TR-SAR reads 17 cm compared with 23 cm for SAR. The range resolution that is governed by the bandwidth of the system remains the same, about 12 cm. The TR-SAR image clearly has a smaller sidelobe level than the SAR image.

The following references are hereby incorporated by reference for all purposes:

[1] M. Soumekh, *Synthetic Aperture Radar Signal Processing*. New York, N.Y.: John Wiley & Sons, Inc., 1999.

[2] W. G. Carrara, R. S. Goodman, and R. M. Majewski, *Spotlight Synthetic Aperture Radar: Signal Processing Algorithms*. Boston, Mass.: Artech House, 1995.

[3] S. R. Deraaf, "SAR imaging via modern 2-D spectral estimation methods," *IEEE Transactions on Image Processing*, vol. 7, no. 5, pp. 729-761, May 1998.

[4] Y. Jin and J. M. F. Moura, "TR-SAR: time reversal target focusing in spotlight SAR." in ICASSP'07, *IEEE International Conference on Signal Processing*. vol. 2. Honolulu, Hi.: IEEE, Apr. 2007, pp. 957-960.

[5] Y. Jin, J. M. F. Moura, M. Mulford, N. O'Donoughue, and A. Samuel, "Time reversal synthetic aperture radar imaging in multipath," in *Proceedings of the 41st Asilomar Conference on Signals, Systems and Computers*. Pacific Grove, Calif.: IEEE, Nov. 2007, pp. 1812-1816.

[6] D. Nguyen, G. Benitz, J. Kay, B. Orchard, and R. Whiting, "Superresolution HRR ATR with high definition vector imaging," *IEEE Transactions on Aerospace and Electronics Systems*, vol. 37, no. 4, pp. 1267-1286, Oct. 2001.

[7] G. Benitz, "High definition vector imaging," *Lincoln Laboratory Journal*, vol. 10, no. 2, pp. 147-170, 1997.

[8] C. V. Jakowatz, D. E. Wahl, P. H. Eichel, D. C. Ghiglia, and P. A. Thompson, *Spotlight-Mode Synthetic Aperture Radar: A Signal Processing Approach*. Boston, Mass.: Kluwer Academic Publishers, 1996.

While the present disclosure has been described in conjunction with preferred embodiments, those of ordinary skill in the art will recognize that many other variations, modifications, and applications are possible. Although the present invention is disclosed in conjunction with synthetic aperture radar, the present invention is not limited to SAR, nor is it limited to two dimensions. In particular, the probing signal $P(\omega)$ is not limited to radar frequencies such that other frequencies, including sound waves, could be used. Additionally, other antenna configurations are possible, and many applications, for example, biomedical tomographic imaging, are envisioned. The present disclosure is intended to be limited only by the following claims.

What is claimed is:

1. A method of producing focused target data, comprising:
    generating target data;
    determining a time delay to the target from said target data;
    wherein said determining a time delay to the target comprises:
        averaging data from a plurality of transmission positions to provide an estimated target location;
        calculating a distance to the target using the estimated target location;

calculating said time delay to the target using said calculated distance to the target and the speed of light;
transmitting a time reversed signal focused by said determined time delay; and
receiving a return in response to said transmitting.

2. The method of claim 1 wherein said generating comprises:
physically transmitting a signal from a first location and receiving a return at a second location a plurality of times, at least one time without the target being present and at least one time with the target being present, and wherein one of said first and second locations is variable and the other location fixed.

3. The method of claim 1 wherein said generating comprises:
physically transmitting a signal from a first location and receiving a return at a second location a plurality of times, at least one time without the target being present and at least one time with the target being present, and wherein said first and second locations are the same.

4. The method of claim 1 wherein an estimated target location is given by
$(\hat{x}_n, \hat{y}_n)$, and wherein said distance to the target is given by:

$$\hat{R}_n(u) = \sqrt{(X_c + \hat{x}_n)^2 + (Y_c + \hat{y}_n - u)^2} + \sqrt{(X_c + \hat{x}_n - X_B)^2 + (Y_c + \hat{y}_n - Y_B)^2}.$$

where $(X_B, Y_B)$ is the location of a fixed antenna, and $(X_c, Y_c)$ is the center of the target area,
where u is a y-axis offset.

5. The method of claim 1, wherein said transmitting a time reversed signal comprises transmitting the signal $kP(\omega)H^*(\omega,u)$ physically, where k is an energy scaling factor, $P(\omega)$ is a channel probing signal, and $H^*(\omega,u)$ represents a response of the channel at frequency $\omega$ and aperture u.

6. An imaging method, comprising:
physically generating clutter data and combined target and clutter data;
using the clutter data to remove the clutter from the combined target and clutter data;
determining a time delay to said target from said target data;
wherein said determining a time delay to said target comprises:
averaging data from a plurality of transmission positions to provide an estimated target location,
calculating a distance to the target using the estimated target location; and
calculating said time delay to said target using said calculated distance to the target and the speed of light;
transmitting a time reversed signal focused by using said estimated target location;
receiving a return in response to said transmitting; and
processing said return to produce an image.

7. The method of claim 6 wherein said physically generating comprises:
physically transmitting a signal from a first location and receiving a return at a second location a plurality of times, at least one time without the target being present to produce said clutter data and at least one time with the target being present to produce said combined target and clutter data, and wherein one of said first and second locations is variable and the other location fixed.

8. The method of claim 6 wherein said generating comprises:
physically transmitting a signal from a first location and receiving a return at a second location a plurality of times, at least one time without the target being present and at least one time with the target being present, and wherein said first and second locations are the same.

9. The method of claim 6 wherein an estimated target location is given by $(\hat{x}n,\hat{y}n)$, and wherein said distance to the target is given by:

$$\hat{R}_n(u) = \sqrt{(X_c + \hat{x}_n)^2 + (Y_c + \hat{y}_n - u)^2} + \sqrt{(X_c + \hat{x}_n - X_B)^2 + (Y_c + \hat{y}_n - Y_B)^2}.$$

where $(X_B, Y_B)$ is the location of a fixed antenna, and $(X_c, Y_c)$ is the center of the target area,
where u is a y-axis offset.

10. The method of claim 6 wherein said transmitting a time reversed signal comprises transmitting the signal $kP(\omega)H^*(\omega, u)$ physically, where k is an energy scaling factor, $P(\omega)$ is a channel probing signal, and $H^*(\omega, u)$ represents a response of the channel at frequency $\omega$ and aperture u.

11. A system comprised of an antenna array and signal processing hardware configured to perform a method of producing focused target data, comprising:
generating target data;
determining a time delay to the target from said target data;
wherein said determining a time delay to the target comprises:
averaging data from a plurality of transmission positions to provide an estimated target location;
calculating a distance to the target using the estimated target location;
calculating said time delay to the target using said calculated distance to the target and the speed of light;
transmitting a time reversed signal focused by said determined time delay; and
receiving a return in response to said transmitting.

12. A system comprised of an antenna array and signal processing hardware configured to perform an imaging method, comprising:
physically generating clutter data and combined target and clutter data;
using the clutter data to remove the clutter from the combined target and clutter data;
determining a time delay to said target from said target data;
wherein said determining a time delay to said target comprises:
averaging data from a plurality of transmission positions to provide an estimated target location;
calculating a distance to the target using the estimated target location; and
calculating said time delay to said target using said calculated distance to the target and the speed of light;
transmitting a time reversed signal focused by using said estimated target location;
receiving a return in response to said transmitting; and
processing said return to produce an image.

* * * * *